United States Patent [19]
Anfindsen

[11] Patent Number: 6,044,370
[45] Date of Patent: Mar. 28, 2000

[54] DATABASE MANAGEMENT SYSTEM AND METHOD FOR COMBINING META-DATA OF VARYING DEGREES OF RELIABILITY

[75] Inventor: Ole Jørgen Anfindsen, Enebakk, Norway

[73] Assignee: Telenor AS, Oslo, Norway

[21] Appl. No.: 09/013,808

[22] Filed: Jan. 26, 1998

[51] Int. Cl.$^7$ .................................................. G06F 17/30
[52] U.S. Cl. ........................................ 707/4; 707/2; 707/3
[58] Field of Search ........................................ 707/4, 3, 2

[56] References Cited

U.S. PATENT DOCUMENTS

| H295383 | 10/1995 | Gallagher. | |
|---|---|---|---|
| 4,769,772 | 9/1988 | Dwyer | 707/2 |
| 5,553,279 | 9/1996 | Goldring | 707/201 |
| 5,838,965 | 11/1998 | Kavanagh et al. | 707/103 |
| 5,899,986 | 5/1999 | Ziauddin | 707/2 |

OTHER PUBLICATIONS

Barbara, D., et al., "A Probabilistic Relational Data Model", Proceedings of the International Conference on Extending Database Technology: Advances in Database Technology, EDBT'90, Venice, Italy, 1990, pp. 60–74.

Codd, E. F., "Extending the Database Relational Model to Capture More Meaning", *ACM Transactions on Database Systems*, vol. 4, No. 4, Dec. 1979, pp. 397–434.

Date, C. J., "Null Values in Database Management", Proceedings of 2nd British National Conference on Databases, Bristol, England, 1982, pp. 147–166.

Gallagher, L., "SQL predicate logic: Dependence on Null Classes", USA DBL position on Null Class logic for SQL3, ISO/IEC JTC1/SC21/WG3 DBL LHR–40, X3H2–95–383, Oct. 5, 1995, 8 pages.

Gessert, G. H. "Handling Missing Data by Using Stored Truth Values", *SIGMOD Record*, vol. 20, No. 3, Sep. 1991, pp. 30–42.

Golshani, F., "Growing Certainty with Null Values", *Inform. Systems*, vol. 10, No. 3, 1985, pp. 289–297.

Gottlob, G., et al., "Closed World Databases Opened Through Null Values", Proceedings of the 14th International Conference on Very Large Databases, Los Angeles, California, 1988, pp. 50–61.

(List continued on next page.)

*Primary Examiner*—Paul R. Lintz
*Assistant Examiner*—Jean Bolte Fleurantin
*Attorney, Agent, or Firm*—Pennie & Edmonds LLP

[57] ABSTRACT

In a database management system (DBMS) or other data processing system or product that stores and processes information, a subset of the stored information is stored as annotated values. Each annotated value has a stored data value and an associated data reliability value, where the data reliability value is a member of a domain that includes at least three distinct data reliability values corresponding to at least three distinct data reliability classifications that can apply to the annotated values stored in the database. Typically, one of the data reliability classifications represents fully reliable data and at least two of the distinct data reliability classifications represent two distinct classifications of missing data or less than fully reliable data. A query executer or other data processing procedure executes queries requesting access to information stored in the database (or other data processing tasks). The query executer includes annotated nullable logic for evaluating expressions containing at least one annotated value as an operand. The annotated nullable logic includes logic (i.e., instructions) for combining annotated values, for comparing annotated values so as to generate annotated truth values, and for combining annotated truth values in accordance with a predefined set of rules. The annotated nullable logic generates result values in a manner that preserves the relevant data reliability values associated with the annotated values and annotated truth values that have been combined and compared.

12 Claims, 2 Drawing Sheets

OTHER PUBLICATIONS

Imielinski, T., et al., "Incomplete Information in Relational Databases", *Journal of the ACM,* vol. 31, No. 4, Oct. 1984, pp. 761–791.

Imielinski, T., "Incomplete Information in Logical Databases", *Data Engineering,* vol. 12, No. 2, Jun. 1989, pp. 29–40.

Imielinski, T., et al., "Incomplete Objects—A Data Model for Design and Planning Applications", Proceedings of ACM SIGMOD International Conference, Denver, Colorado, 1991, pp. 288–297.

Lu, K. C., et al., "Indefinite and Maybe Information in Relational Databases", *ACM Transactions on Database Systems,* vol. 15, No. 1, Mar. 1990, pp. 1–39.

Lu, J. J., et al., "Signed Formulas and Annotated Logics", IEEE International Symposium on Multiple Valued Logic, Sacramento, California, 1993, pp. 48–53.

Motro, A., "Accomodating Imprecision in Database Systems: Issues and Solutions", *ACM SIGMOD Record,* vol. 19, No. 4, Dec. 1990, pp. 69–74.

Motro, A., "Imprecision and incompleteness in relational databases: survey", *Information and Software Technology,* vol. 32, No. 9, Nov. 1990, pp. 579–588.

Vassiliou, Y, "Null Values in Data Base Management: A Denotational Semantics Approach", ACM SIGMOD 1979 Int. Conference on Manage. Of Data, May 30–Jun. 1, 1979, pp. 162–169.

Zaniolo, C., "Database Relations with Null Values", *Journal of Computer and System Sciences,* 28, 1984, pp. 142–166.

Zicari, R., et al., "Incomplete Information in Object–Oriented Databases", *ACM SIGMOD Record,* vol. 19, No. 3, Sep. 1990, pp. 5–16.

DATABASE MANAGEMENT SYSTEM AND METHOD FOR COMBINING META-DATA OF VARYING DEGREES OF RELIABILITY

The present invention relates generally to database management systems and transaction processing systems, and particularly to a database management system and method for utilizing and combining data, some of which is entirely reliable and some of which is less reliable, unknown or missing, using a methodology herein called annotated nullable logic for comparing and combining annotated data and truth values in a manner that preserves reliability category information associated with the data and truth values being compared and/or combined.

BACKGROUND OF THE INVENTION

There are situations in which some of the data values used by a transaction are missing or completely unknown. Missing information is sometimes called null data. The use of null data in a database management system (DBMS) requires extensions to the framework used for predicate evaluation during query execution. In particular, when a predicate is evaluated against a null, the result of the evaluation cannot be true or false. Thus, to allow or support evaluations that involve nulls, one must introduce a value called "maybe" or "unknown" as a truth value, or introduce Boolean nulls. Since predicates can be combined by means of the operators AND, OR and NOT to form arbitrarily complex predicates, rules are needed to specify the results of evaluating complex predicates. This is usually done by means of an appropriate form of algebra. For example, when there are no nulls involved, evaluation of complex predicates is performed according to Boolean algebra. Generally, prior art DBMS's that support null data support only one kind of null data and evaluate complex predicates having one or more null data values using three valued logic.

The present invention was developed, in part, based on the premise that it would be desirable in many applications to have more than one kind of null, where the different types of nulls represent the different reasons why information is missing (e.g., "unknown," "divide by zero," "undefined," "prohibited," and so on). Although it is possible to allow multiple kinds of null data and still use three valued logic, using a three valued logic process to evaluate truth expressions having multiple kinds of null data effectively erases all information about the kinds of null data involved.

Furthermore, in addition to data being missing, there are situations in which data values are not missing, but are also not 100% reliable. For example, when a transaction uses "browse" access to read data, some of the data read by the transaction may be uncommitted data written by active transactions. More specifically, some of the data read by the transaction with browse access may be write locked by other transactions, while other portions of the data read may not be write locked by any other transactions. As a result, some of the data (i.e., the data not write locked by any other transaction) read by the transaction with browse access will be 100% reliable, while some other portions of the data (i.e., the data write locked by other transactions) will be less than 100% reliable.

When a write lock is held by a long lived transaction (LLT), the transaction is likely to have different phases and the values of the data on which write locks are held may have corresponding levels of reliability. Typically, data values for which an LLT hold write locks will be least reliable at the beginning phases of the LLT and more reliable at the later phases of the LLT. The prior art, however, treats all such data uniformly as either unreliable data or null data.

It is a goal of the present invention to provide a more flexible mechanism for evaluating queries that are functions of data having multiple levels or classifications of unreliability. In particular, it is a goal of the present invention to provide a query evaluation technique that classifies data with respect to its type, degree or classification of unreliability and that maintains and properly combines data unreliability classification information as it evaluates complex query expressions.

SUMMARY OF THE INVENTION

In summary, the present invention is a data processing method suitable for use in a database management system (DBMS) or other data processing system or product that stores and processes information. A subset of the stored information is stored as annotated values, each annotated value having a stored data value and an associated data reliability value. That is, the data value is annotated with a data reliability value. The data reliability value associated with each datum is a member of a domain that includes at least three distinct data reliability values corresponding to at least three distinct data reliability classifications. Typically, one of the data reliability classifications represents fully reliable data and at least two of the distinct data reliability classifications represent two distinct classifications of less than fully reliable data. For example, the domain of reliability categories might include the following six reliability categories: fully reliable, good, medium, poor, unknown and missing.

A query executer or other data processing procedure executes queries (or other data processing tasks) requesting access to information stored in the database. The query executer includes annotated nullable logic for evaluating expressions containing at least one annotated value as an operand. The annotated nullable logic includes logic (i.e., instructions) for combining annotated values, for comparing annotated values so as to generate annotated truth values, and for combining annotated truth values in accordance with a predefined set of rules. The annotated nullable logic generates result values in a manner that preserves the relevant data reliability values associated with the annotated data and/or truth values that have been combined and/or compared.

In a preferred embodiment, the data reliability values associated with the annotated values are each encoded as a reliability category bitmap having a multiplicity of bits. Each bit of the bitmap corresponds to a respective data reliability classification. Since fully reliable data does not need to be annotated, or can be annotated with a bitmap whose bits are all set to zero, the number of bits in the annotation bitmap is typically one less than the number of distinct data reliability classifications.

The annotated nullable logic includes means for combining first and second annotated values (k, A) and (m, B) using a predefined operator Op to generate an annotated result value (r, C):

(k, A) Op (m, B)=(r, C)

where k, m and r represent data values or truth values, and A, B and C represent data reliability values associated with the annotated first, second and result values. respectively. For some types of operations, such as numeric combining operations (addition, subtraction, multiplication, division, numeric value comparison), character manipulation operations and certain logic operations (e.g., AND, NAND, XOR, XNOR), the annotation bitmap for data reliability value C is generated by forming a bitwise union of the bitmaps for operands A and B. For other types of operations, such as OR'ing logical operands, the bitmap for data reliability value C is generated by selecting one operand's annotation bitmap (e.g., in the case of the OR operation, the annotation bitmap for operand having the strongest truth value is selected).

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
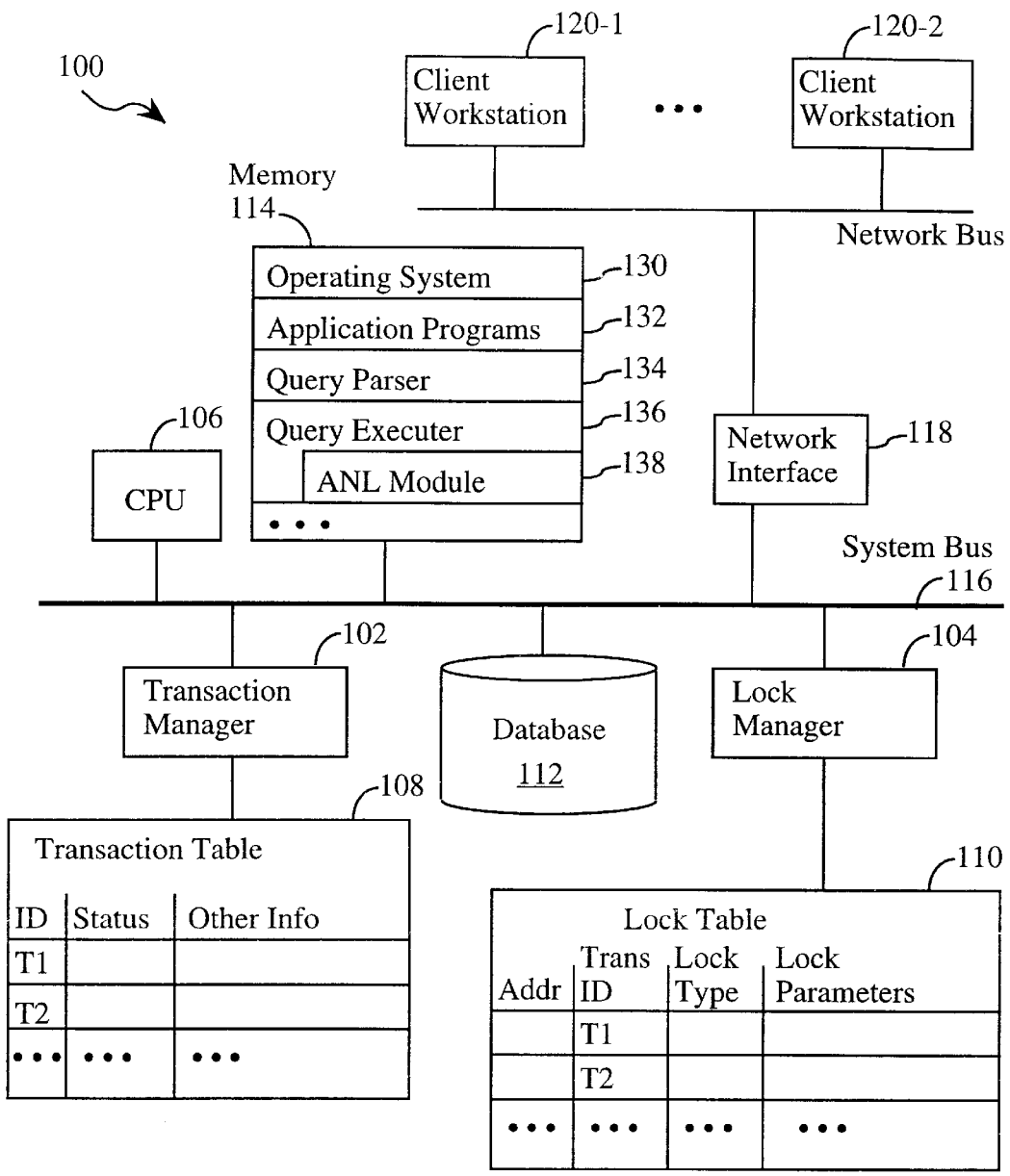
FIG. 1 is a block diagram of a database management system implementing the present invention.

Referring to FIG. 1, there is shown a database management system (DBMS) 100. Transaction operation and management are handled by a transaction manager 102 and a lock manager 104, both of which are software porcedures executed by the system's data processor(s) 106. The transaction manager maintains a transaction table 108, sometimes implemented as a tree structure, for keeping track of the identity and status of all pending transactions. The lock manager 104 maintains a lock table 110, usually implemented using a hash table and various linked lists and/or tree structures. The lock table 110 keeps track of all locks that have been requested on resources in a database 112. The database 112 stores all of the data that is accessible to transactions executed by the DBMS 100.

The DBMS 100 will typically also include additional memory resources 114, one or more system busses 116 for interconnecting the various parts of the system, and a network interface 118 or other communications interface for handling communications with client workstations 120.

A "data lock" is a mechanism for assigning a transaction certain rights to a database object, such as a table, a page, or a datum or record in a database table. Thus a first transaction may lock a particular object so as to ensure that no other transaction accesses the data in that data until the first transaction commits or aborts. The prior art includes many types of data locking mechanisms.

An "access mode" refers to the way in which a transaction or application accesses a data resource. The traditional access modes are browse, read, update, write and exclusive. Other access modes include parameterized read and write access modes. These are described in U.S. patent application 08/xxx, filed Jan. 26, 1998, which is hereby incorporated by reference in its entirety. For the purposes of this document, it is sufficient to know that when a transaction accesses data using a parameterized write access mode, the value of the associated write access parameter may be suitable for interpretation as a data reliability classification or category for the data values covered by the write lock held on that data. If the DBMS provides a read/write parameter domain having eight parameter values (each represented by a corresponding bit of an eight-bit parameter field), that system would allow for the definition of up to eight different data reliability classifications for data covered by parameterized write locks (i.e., there might be additional data reliability classifications for data not covered by parameterized write locks).

As indicated earlier, for a variety of reasons and within many different application domains, data values in a database are not always accurate. While it is often difficult, if not impossible, to quantify the degree of uncertainty for a given piece of information, it is much easier to classify the information in question. For example, information could be classified as being:

based on samples;
based on polls;
based on extrapolation;
based on interpolation;
based on estimates;
based on guesstimates;
based on rumors;
based on presumably biased reports;
based on neutral sources;
based on statistics of reliability class x;
measured with an instrument of reliability class y;
likely to change in the (near) future;
continuously changing; or
a snapshot.

Many other classifications could be useful, depending on the application domain.

Meta-Data

Unlike prior art three-valued logic systems that utilize a special "unknown" value, the present invention annotates both data and logic values that are less than fully reliable. Instead of replacing these values with a special "unknown value," they are annotated with a meta-value representing a reliability classification.

Figures 2A, 2B:
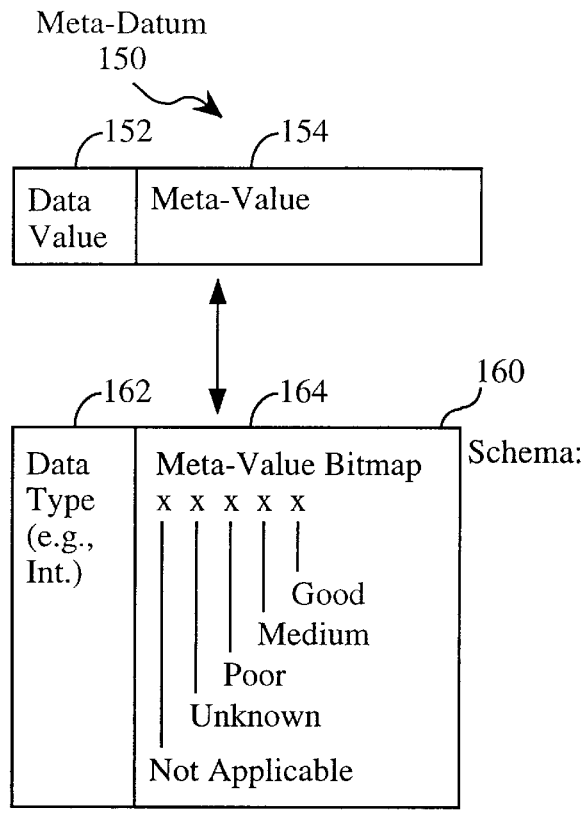
FIG. 2A depicts the data structure of a meta-datum and its schema.
FIG. 2B depicts some examples of meta-data values.

Referring to FIGS. 2A and 2B, information or data that has been assigned a reliability classification will be called meta-data or meta-information. Meta-data provides information about the data that is being manipulated. FIG. 2A represents one possible schema for representing the reliability of a meta-data value. In this example a meta-datum 150 is encoded as a data value 152 and a meta-value 154. The schema 160 for the meta-datum, which would typically be stored as part of the schema for a database table or object, includes: a data type 162 for the data value 152, and a meta-value type 164 specified using a bitmap representation.

In this simplified example the meta-value bitmap has five defined bit fields. The first two bits of the meta-value are used to indicate cases of missing data while the third through fifth bits are used to indicate degrees of reliabiiity of data that is not missing. More specifically, the first bit is set when a datum's value is not applicable. The second bit is set when a datum's value is unknown, the third bit is set when the reliability of a datum's value is poor, the fourth bit is set when the reliability of a datum's value is medium, and the fifth bit is set when the reliability of a datum's value is good. FIG. 2B represents some examples of meta-data values. Note that a data value that is 100% reliable is indicated by a zero meta-value.

More generally, the meta-value associated with a meta-datum will be encoded so as to represent a data reliability classification, a data uncertainty classification, or the like. The meta-value need not be represented as a bit map. However, if the number of distinct data reliability classifications is small (e.g., less than or equal to the number of bits in a memory word), the bit map representation may be convenient and inexpensive to implement.

Depending on the circumstances, a data reliability parameter may be associated with a single datum, with a database tuple, or with a larger set of data.

Annotated Nullable logic

Referring to FIG. 1, the present invention uses a form of computational logic herein called annotated nullable logic (ANL) for combining meta-data values.

In the context of the DBMS 100 shown in FIG. 1, the memory 114 of the system, which will typically include volatile memory (e.g., high speed random access memory) as well as non-volatile memory (e.g., disk storage), will typically contain:

an operating system 130 for handling platform dependent tasks as well as typical operating system functions such as memory management, file system management, input/output tasks, and the like;

application programs 132, which use the DBMS to store and retrieve data, perform transactions and resource management;

a query parser 134, which parses and compiles queries received from application programs and users into execution plans;

a query executer 136, which performs database access operations, including query predicate processing; and other programs not directly relevant to the present discussion.

The annotated nullable logic techniques of the present invention are primarily embodied in the query executer 136, and possibly also in the application programs 132, depending on the division of computational duties between the application programs 132 and the query engine 134/136 of the DBMS. FIG. 1 shows the query executer 136 as including an ANL module 138 for evaluating ANL expressions, also called meta-data expressions. Alternately, the ANL evaluation logic in the query executer 136 (and in the application program 132) may be implemented as in-line code within the query executer, instead of as a separate module or function.

As shown in Table 1, performing standard mathematical data combining operations (e.g., addition, subtraction, multiplication, division, concatenation of strings, and the like) on meta-data operands is accomplished by:

(A) performing the indicated mathematical data combining operation on the data-value portions of the meta-data operands, with the caveat that when one of the operands has an unknown or missing data value, the output data value is meaningless and may be represented as an unknown or missing data value; and (B) performing a bitwise union of the meta-values of the operands.

When a mathematical data combining operation is performed on two non-annotated (ordinary, fully reliable) values, the result is another non-annotated value. More generally, when two values (also called operands) of the same reliability classification are combined, a result with the same reliability classification results. When a mathematical data combining operation is performed on a non-annotated value and an annotated value, the non-annotated value is explicitly or implicitly converted into an annotated value (with a reliable data meta-value) and then the two values are combined.

When two annotated operands of different degrees of reliability are mathematically combined, the result will be annotated with a bitwise union of the meta-values of two operands. It should be noted that when a value is annotated with two or more reliability classifications, in most application environments it is only the least reliable classification that is significant. For instance, if a value is annotated is being of both poor medium reliability, the "medium" reliability classification is generally meaningless because the "poor" reliability classification is dominant. As a result, instead of combining annotations by forming a bitwise union of the annotations of the operands, it would be possible in alternate embodiments to combine annotations by generating a value representing the lowest reliability classification of the operands being combined. This methodology of selecting the lowest reliability classification, where appropriate, also has the advantage of working in embodiments where reliability classification annotations are encoded using a mechanism other than bitmaps.

The present invention does not require special handling for unknown and missing values. When combining two values, one of which is unknown (i.e., null in SQL parlance) the result is unknown. For instance, if both the "unknown" and "medium" reliability classification bits for a result are set, the result is unknown because the "unknown" classification is dominant over the "medium" classification.

TABLE 1

Examples of Mathematical Operations using Annotated Nullable Logic

1) Example of adding two reliable numbers:
   (5 ; 0 0 0 0 0) + (3 ; 0 0 0 0 0) = (8 ; 0 0 0 0 0)
2) Example of adding two numbers having same reliability classification:
   (2.1 ; 0 0 0 0 1 ) + (3.3 ; 0 0 0 0 1) = (5.4 ; 0 0 0 0 1)
3) Examples of adding two numbers having different reliability classifications:
   (7 ; 0 0 0 1 0) + (2 ; 0 0 1 0 0) = (9 ; 0 0 1 1 0)
   (3 ; 0 0 1 0 0) + (N/A; 1 0 0 0 0) = (N/A; 1 0 1 0 0)
4) Example of concatenating two strings having different reliability classifications:
   (NEWARK ; 0 0 0 1 0) + (AIRPORT ; 0 0 0 0 0) =
   (NEWARK AIRPORT ; 0 0 0 1 0)

In classical environments there are only two logical (or Boolean) values: True and False. In an ANL environment, there are still the same two logical values. Like values from all other domains (such as integers, real numbers, or strings), logic values in ANL may be annotated with meta-values. Logical values are often the result of comparisons between other values. For example, execution of an SQL query may require the expression x<4 to be evaluated for all the rows in a table (assuming the table has a column called x). For each row of the table, this expression will evaluate to either True or False. Alternatively if the DBMS in question supports null values, the expression may sometimes (i.e., for some rows of the table) evaluate to a third logical value: unknown.

Table 2 contains some examples of comparisons of meta-data values (operands) using annotated nullable logic. The truth value part of the result generated by each comparison is equal to True, False or N/A (indicating that the truth value, if any, is meaningless). Generally, the meta-value for each comparison result is generated by performing a bitwise union (i.e., a bitwise logical OR'ing) of the meta-values of the operands. As in the example of combining meta-data operands, when a truth value generated by a meta-data comparison is annotated with two or more reliability classifications, in most application environments it is only the least reliable classification that is significant.

TABLE 2

Examples of Numeric Comparison
Operations using Annotated Nullable Logic

1) Example of comparing two reliable numbers:
   (4 ; 0 0 0 0 0) < (5 ; 0 0 0 0 0) = (True ; 0 0 0 0 0)
2) Examples of comparing two numbers having different reliability classifications:
   (2 ; 0 0 0 0 1) = (2 ; 0 0 0 0 0) = (True ; 0 0 0 0 1)
   (3 ; 0 0 1 0 0) > (4 ; 0 0 0 1 0) = (False ; 0 0 1 1 0)
4) Example of comparing reliable number with missing (not applicable) data value:
   (6 ; 0 0 0 0 0) < (N/A ; 1 0 0 0 0) = (N/A ; 1 0 0 0 0)

Truth values can be combined by using the Boolean operators AND, OR and NOT (as well as other operators such as NAND, NOR, XOR and XNOR, that are derived from these basic operators). This is done routinely when formulating SQL database queries. As shown in Table 3, this is clone in much the same way when using the annotated nullable logic technique of the present invention. The first example in Table 3 shows that "True AND True" yields a value of "True." However, since the operands for the AND operator are annotated, the result is annotated as well. When combining logical operands using the AND, NAND, XOR or XNOR operators, the meta-value for the result is generated by performing a bitwise union (i.e., a bitwise logical OR'ing) of the meta-values of the operands. When combining logical operands using the OR or NOR operators, the mega-value for the result is generated by selecting one of the operands' meta-values (e.g., in the case of the OR operation, the meta-value for the operand having the strongest truth value is selected).

TABLE 3

Examples of Combining Truth Values using Annotated Nullable Logic

1) Examples of using AND to combine two truth values having different reliability classifications:
   (True ; 0 0 0 1 0) AND (True ; 0 0 0 0 1) = (True ; 0 0 0 1 1)
   (True ; 0 0 0 1 0) AND (False ; 0 0 0 0 1) = (False ; 0 0 0 0 1)
   (False ; 0 0 0 1 0) AND (False ; 0 0 0 0 1) = (False ; 0 0 0 1 1)
2) Examples of using OR to combine two truth values having different reliability classifications:
   (True ; 0 0 1 0 0) OR (True ; 0 0 0 0 0) = (True ; 0 0 0 0 0)
   (True ; 0 0 1 0 0) OR (True ; 0 0 0 0 1) = (True ; 0 0 1 0 1)
   (True ; 0 0 1 0 0) OR (False ; 0 0 0 0 1) = (True ; 0 0 1 0 0)
3) Example of using AND to combine a reliable truth value with a missing truth value:
   (True ; 0 0 0 0 0) AND (N/A; 1 0 0 0 0) = (N/A; 1 0 0 0 0)
4) Example of using OR to combine a reliable truth value with missing truth value:
   (False ; 0 0 0 0 0) OR (N/A ; 0 1 0 0 0) = (N/A ; 0 1 0 0 0)

When an unknown value is logically combined with a True or False value, an unknown truth value may or may not result, depending on the operation being performed. More particularly, Table 4 sets forth the rules that govern the combining of truth values in the preferred embodiment.

In summary, the annotated nullable logic combines first and second annotated values (k, A) and (m, B) using a predefined operator Op to generate an annotated result value (r, C):

(k, A) Op (m, B)=(r,C)

where k, m and r represent data values or truth values, and A, B and C represent data reliability values associated with the annotated first, second and result values, respectively. For some types of operations, such as numeric combining operations (addition, subtraction, multiplication, division, numeric value comparison), character manipulation operations and certain logic combining operations (e.g, AND, NAND, XOR, XNOR), the annotation bitmap for data reliability value C is generate by forming a bitwise uIiOII of the bitmaps for operands A and B. For other types of operations, Such as OR'ing logical operands, the bitmap for data reliability value C is generated by selecting one operand's annotation bitmap (e.g., in the case of the OR operation, the annotation bitmap for operand having the strongest truth value is selected).

TABLE 4

Rules for Combining Truth Values using Annotated Nullable Logic

Notation:
  Truth Values:
    t means True
    f means False
    qt means Quasi True
    qf means Quasi False
    u means unknown
    Strength of truth values: f < qf < u < qt < t.
    l, m each mean a truth value that may be True, False, Quasi True, Quasi False, or unknown, with the following relative strength of truth: $1 \leq m \leq True$.
  Annotation Meta-Values:
    ∅ means the empty set
    A, B each mean a non-empty set of meta-values
    N is a non-empty set of meta-values that indicate missing information (as opposed to unreliable information)
    M is a non-empty set of meta-values that indicate unreliable information (as opposed to missing information)
  Annotated Truth Values:
    (t, ∅) means True
    (f, ∅) means False
    (f, N) and (t, N) both mean maybe (or unknown)
    (t, M) means Quasi True, also denoted (qt, M)
    (f, M) means Quasi False, also denoted (qf, M)
  Basic ANL NOT operations:
    NOT (t, ∅)   = (f, ∅)      (the inverse of True is False)
    NOT (t, N)   = (f, N)      (the inverse of maybe is maybe)
    NOT (f, ∅)   = (t, ∅)      (the inverse of False is True)
    NOT (qt, M)  = (qf, M)     (the inverse of Quasi True is Quasi False)
    NOT (qf, M)  = (qt, M)     (the inverse of Quasi False is Quasi True)
  ANL Universal Bounds:
    x OR False  = x or (f, ∅)  = x
    x OR True   = x or (t, ∅)  = (t, ∅)
    x AND False = x AND (f, ∅) = (f, ∅)
    x AND True  = x AND (t, ∅) = x
  ANL OR and AND operations:
    (m, A) OR (m, B)   = (m, A∪B)
    (l, A) OR (m, B)   = (m, B)
    (m, A) AND (m, B)  = (m, A∪B)
    (l, A) AND (m, B)  = (l, A)
  Commutativity:
    (x and y are logical values, annotated or not)
    x AND y  = y AND x
    x OR y   = y OR x Alternate Embodiments In an alternate embodiment, for each combining and comparing operation where the preferred embodiment forms the union of the operands' meta-values, the ANL could instead generate a result meta-value representing the lowest reliability category associated with the operands. This would reequire the reliability categories to be ordered with regard to reliability to enable a determination of the lowest applicable reliability category.

The present invention could be used even in systems having just two levels of data reliability: reliable and unreliable, or reliable and missing. In such systems, meta data values would be annotated with a data reliability value that could be as short as a single bit (e.g., equal to 0 for reliable data and 1 for unreliable or missing data). However, the advantages of the present invention over systems using three valued logic are most readily appreciated when at least three distinct levels or categories of data reliability are used.

The present invention may be implemented hn DBMS's, application programs, persistent programming languages, as well as other types of computer systems and products. It may be distributed either in the form of such systems, or as a computer program product that is distributed on computer readable media such as magnetic data storage media (i.e., disks or tapes), CDROM, or the like. A computer program product embodiment of the present invention may be distributed electronically, over the Internet or other communications network, as a computer data signal embodied in a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A data management system, comprising:

a database, the database storing information, a subset of the stored information comprising annotated values, each annotated value having a stored data value and an associated data reliability value, wherein the data reliability value is a member of a domain that includes at least three distinct data reliability values corresponding to at least three distinct data reliability classifications that can apply to the annotated values stored in the database; and a query executer for executing queries requesting access to information stored in the database;

the query executer including annotated nullable logic for evaluating expressions containing at least one annotated value as an operand, wherein the annotated nullable logic includes logic for combining annotated values, for comparing annotated values so as to generate annotated truth values, and for combining annotated truth values in accordance with a predefined set of rules and so as to preserve relevant ones of the data reliability values associated with the annotated values and annotated truth values that have been combined and compared;

wherein the annotated nullable logic includes logic for combining first and second annotated values (k, A) and (m, B) using a predefined operator OP to generate an annotated result value (r, C):

k, A) Op (m, B)=(r, C)

where k, m and r represent data values or truth values, and A, B and C represent data reliability values associated with the annotated first, second and result values, respectively; and C is generated by the annotated nullable logic by combining A and B.

2. The data management system of claim 1, wherein the data reliability values associated with the annotated values are each encoded as a reliability category bitmap having a plurality of bits that each correspond to a respective one of the data reliability classifications; and C is generated by the annotated nullable logic by generating a union of A and B.

3. The data management system of claim 2, wherein one of the data reliability classifications represents fully reliable data and at least two of the distinct data reliability classifications represent two distinct classifications of missing data or less than fully reliable data.

4. A data processing product, comprising:

means for storing information, a subset of the stored information comprising annotated values, each annotated value having a stored data value and an associated data reliability value, wherein the data reliability value is a member of a domain that includes at least three distinct data reliability values corresponding to at least three distinct data reliability classifications that can apply to the annotated values stored in the database; and means for performing information processing using the stored information;

the information processing means including annotated nullable logic for evaluating expressions containing at least one annotated value as an operand, wherein the annotated nullable logic includes logic for combining annotated values, for comparing annotated values so as to generate annotated truth values, and for combining annotated truth values in accordance with a predefined set of rules and so as to preserve relevant ones of the data reliability values associated with the annotated values and annotated truth values that have been combined and compared;

wherein the annotated nullable logic includes logic for combining first and second annotated values (k, A) and (m, B) using a predefined operator Op to generate an annotated result value (r, C):

(k, A) Op (m, B)=(r, C)

where k, m and r represent data values or truth values, and A, B and C represent data reliability values associated with the annotated first, second and result values, respectively; and C is generated by the annotated nullable logic by combining A and B.

5. The data processing product of claim 4, wherein the data reliability values associated with the annotated values are each encoded as a reliability category bitmap having a plurality of bits that each correspond to a respective one of the data reliability classifications; and C is generated by the annotated nullable logic by generating a union of A and B.

6. The data processing product of claim 5, wherein one of the data reliability classifications represents fully reliable data and at least two of the distinct data reliability classifications represent two distinct classifications of missing data or less than fully reliable data.

7. A data processing method, comprising the steps of:

storing information, a subset of the stored information comprising annotated values, each annotated value having a stored data value and an associated data reliability value, wherein the data reliability value is a member of a domain that includes at least three distinct data reliability values corresponding to at least three distinct data reliability classifications that can apply to the annotated values stored in the database; and performing information processing using the stored information;

the information processing step including combining annotated values to generate new annotated value, comparing annotated values so as to generate annotated truth values, and combining annotated truth values in accordance with a predefined set of rules and so as to preserve relevant ones of the data reliability values associated with the annotated values and annotated truth values that have been combined and compared;

wherein
the annotated nullable logic includes logic for combining first and second annotated values (k, A) and (m, B) using a predefined operator OP to generate an annotated result value (r, C):

(k, A) Op (m, B)=(r, C)

where k, m and r represent data values or truth values, and A, B and C represent data reliability values associated with the annotated first, second and result values, respectively; and C is generated by the annotated nullable logic by combining A and B.

8. The data processing method of claim 7, wherein
the data reliability values associated with the annotated values are each encoded as a reliability category bitmap having a plurality of bits that each correspond to a respective one of the data reliability classifications; and C is generated by the annotated nullable logic by generating a union of A and B.

9. The data processing method of claim 8, wherein one of the data reliability classifications represents fully reliable data and at least two of the distinct data reliability classifications represent two distinct classifications of missing data or less than fully reliable data.

10. A computer program product for use in conjunction with a computer system, the computer program product comprising a computer readable storage medium and a computer program mechanism embedded therein, the computer program mechanism comprising:

instructions for storing information in a storage device associated with the computer system, a subset of the stored information comprising annotated values, each annotated value having a stored data value and an associated data reliability value, wherein the data reliability value is a member of a domain that includes at least three distinct data reliability values corresponding to at least three distinct data reliability classifications that can apply to the annotated values stored in the database; and instructions for performing information processing using the stored information;

the information processing instructions including annotated nullable logic instructions for evaluating expressions containing at least one annotated value as an operand, wherein the annotated nullable logic includes logic for combining annotated values, for comparing annotated values so as to generate annotated truth values, and for combining annotated truth values in accordance with a predefined set of rules and so as to preserve relevant ones of the data reliability values associated with the annotated values and annotated truth values that have been combined and compared;

wherein
the annotated nullable logic instructions include instructions for combining first and second annotated values (k, A) and (m, B) using a predefined operator OP to generate an annotated result value (r, C):

(k, A) Op (m, B)=(r, C)

where k, m and r represent data values or truth values, and A, B and C represent data reliability values associated with the annotated first, second and result values, respectively; and C is generated by the annotated nullable logic by combining A and B.

11. The computer program product of claim 10, wherein
the data reliability values associated with the annotated values are each encoded as a reliability category bitmap having a plurality of bits that each correspond to a respective one of the data reliability classifications; and C is generated by the annotated nullable logic by generating a union of A and B.

12. The computer program product of claim 11, wherein one of the data reliability classifications represents fully reliable data and at least two of the distinct data reliability classifications represent two distinct classifications of missing data or less than fully reliable data.

* * * * *